United States Patent [19]

Daniels

[11] Patent Number: 4,822,387
[45] Date of Patent: Apr. 18, 1989

[54] INVERSE FLOW DEPTH FILTER ASSEMBLY

[75] Inventor: Keith L. Daniels, Birdsboro, Pa.

[73] Assignee: Reading Technologies, Inc., Reading, Pa.

[21] Appl. No.: 112,256

[22] Filed: Oct. 22, 1987

[51] Int. Cl.⁴ .............................................. B01D 46/00
[52] U.S. Cl. ........................................ 55/323; 55/482; 55/486; 55/525
[58] Field of Search ................ 55/97, 267, 218, 274, 55/219, 319, 320, 321, 329, 337, 323, 488, 498, 486, 525; 210/314, 315, 316, DIG. 13

[56] References Cited

U.S. PATENT DOCUMENTS

| | | | |
|---|---|---|---|
| 1,531,096 | 3/1925 | Hoffman | 55/486 |
| 2,058,189 | 10/1936 | Stuard | 55/486 |
| 2,402,140 | 6/1946 | Heintzelman | 55/482 |
| 2,521,785 | 9/1950 | Goodloe | 55/97 |
| 2,771,533 | 1/1957 | Segrest | 55/185 |
| 3,252,270 | 5/1966 | Pall et al. | 55/486 |
| 3,364,658 | 1/1968 | Walker | 210/316 |
| 3,415,041 | 12/1968 | Kraissl | 210/315 |
| 4,226,179 | 10/1980 | Sheldon et al. | 55/487 |
| 4,336,043 | 6/1982 | Aonuma et al. | 55/218 |
| 4,487,618 | 12/1984 | Mann | 55/482 |
| 4,707,168 | 11/1987 | Mizuanti | 55/274 |

FOREIGN PATENT DOCUMENTS 138578 4/1985 European Pat. Off. ............ 55/267

Primary Examiner—Bernard Nozick
Attorney, Agent, or Firm—Steele, Gould & Fried

[57] ABSTRACT

An inverse flow depth filter assembly includes an elongated, generally elliptical housing with gas inlet and egress means and a bottom drain. A filter cartridge is suspended from the housing top so that an annular channel is created between the housing and the cartridge. The cartridge has a plugged top and an open bottom. Air enters the housing and is channeled downward through the annular channel until it reaches the cartridge bottom. Air then enters the cartridge bottom to flow in an upward vertical pattern through the filter element. The filtered air then passes through ports in the plug and exits the housing through the gas egress means.

10 Claims, 2 Drawing Sheets

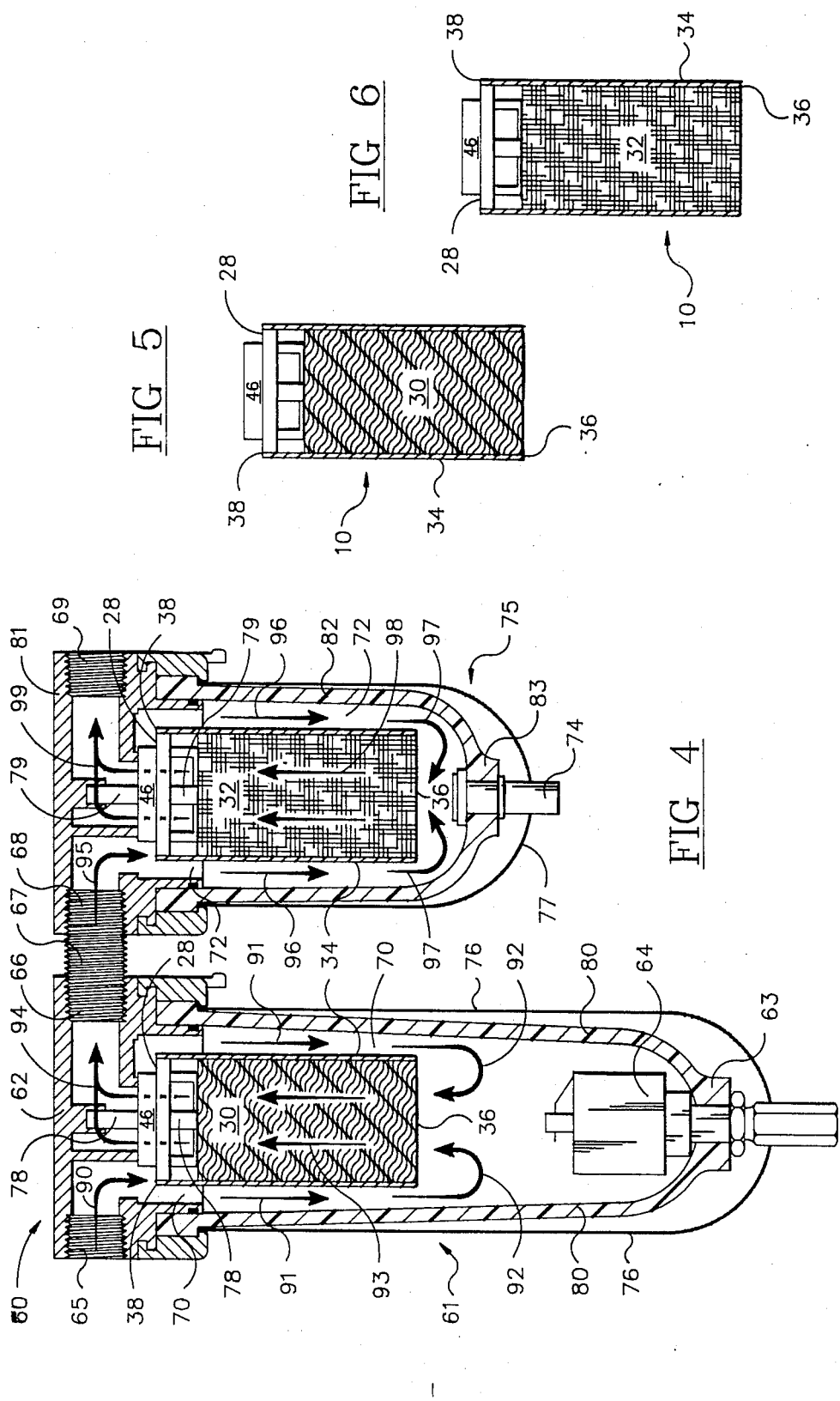

INVERSE FLOW DEPTH FILTER ASSEMBLY

BACKGROUND OF THE INVENTION

1. Field of the Invention

This invention relates to gas and liquid contact apparatus and, in particular, to filtering liquids from flowing gases.

2. Description of the Prior Art

There are many devices in use to filter liquids and solid particles from air as it passes through air lines. To collect and remove liquid droplets and solid particulates, some devices rely on the use of various filtering elements, while others rely on the pattern and velocity of the air as it passes through the lines. Examples of the latter are U.S. Pat. No. 2,168,512 to Browning and U.S. Pat. No. 845,807 to Miller. Browning shows an air line trap with air flowing through baffles so that condensates collect at the bottom of the trap. Miller shows a water separator which directs air downward with baffles. Neither of the aforementioned use filter elements or address the necessary pattern of air flow necessary to achieve the quickest and most efficient filtering through filter elements.

U.S. Pat. No. 3,791,105 to Rhodes shows oil filtering to remove fluid and oil in a two-stage device. The fluid is removed in the upper stage and oil drains out the bottom of the lower stage.

U.S. Pat. No. 2,204,017 to Kehle uses the velocity of the air through baffles to cause droplets to fall and drain from a lower chamber.

Mann, in both U.S. Pat. Nos. 4,600,416 and 4,487,618, discloses an airline vapor trap for removing water and/or oil vapor from a compressed air line. The trap uses two cartridges, one with a wire fiber pad and the other with spirally wound fiber. A base plate includes parallel louvers to collect condensates. There is a drain at the bottom of one of the cartridges for removal of condensates and debris. The air flows down one cartridge and up the other cartridge.

It is of special importance in the fluid power industry, in particular with compressed air systems, to achieve efficient filtration wtihout loss of pressure because pressure loss will affect operation of the equipment and may even cause equipment failure.

None of the aforementioned prior art discloses a filtering system and equipment which forces air into a pattern which most efficiently utilizes the filtering elements and still maintains high pressure levels. None of the prior art provides a separate cartridge for containing the filter element inside the filter housing, the separate cartridge forming a channel with the housing to direct the air flow vertically upward through all filter elements.

SUMMARY OF THE DISCLOSURE

The aforemention prior art problems are obviated by the inverse flow depth filter of this invention. There are two embodiments to the inverse flow depth filter of this invention, one with a single filter housing and another embodiment with two housings in tandem.

In each embodiment, each housing is elongated and preferably elliptical, and includes a top and a bottom. The top includes gas inlet means and gas egress means, and the bottom of the housing includes drain means. A generally hollow, tubular, filter cartridge, with a generally closed top and an open bottom, hangs from the housing's top underside so that an annular channel is created between the housing and the cartridge. The cartridge top includes gas egress means which lead into the gas egress means in the housing. When gas under pressure enters the housing through the gas inlet means and flows downward into the annular channel, it is channeled upward through the cartridge bottom into the filter, to exit at the cartridge top through the gas egress means. In the single housing embodiment, two preferably dissimilar filters are stacked atop one another in the filter cartridge. In the tandem housing embodiment, there are two housings, each containing a filter cartridge, the two cartridges containing, preferably, dissimilar filter elements.

Of greatest importance in both embodiments, is the pattern of air flow upwards through both filter elements. It has been proved by testing that the filter elements are most efficient when air flows through them in an upward pattern. By providing a wall between the filter element and the housing, the air is forced upward through the filter cartridge, utilizing the filter elements to their greatest potential. In the prior art, air flowed into several directions through the filter elements.

It is, therefore, an object of this invention to provide an inverse flow depth filter assembly for pressurized gaseous systems in which a cartridge is provided to house the filter elements.

It is another object of this invention to provide an inverse flow depth filter assembly for pressurized air systems in which the air flow is directed upwards for greatest filter efficiency.

It is still another object of this invention to provide an inverse flow depth filter assembly for pressurized gaseous systems in which the housing and a cartridge form a channel therebetween to direct gas flow.

It is yet another object of this invention to provide an inverse flow depth filter assembly for pressurized gaseous systems which uses tandem housings, each having a filter cartridge.

It is a further object of this invention to provide an inverse flow depth filter assembly which houses two dissimilar filters in a single cartridge.

These and other objects will be more readily ascertainable to one skilled in the art from a consideration of the following Figures, description and exemplary embodiments.

BRIEF DESCRIPTION OF THE DRAWING(S)

FIG. 4 is a cross section of the tandem housing embodiment of this invention, including arrows to illustrate air flow.

FIG. 5 is a cross section of one of the cartridges of FIG. 4 with a filter element inside.

FIG. 6 is a cross section of the other cartridge of FIG. 4 with a dissimilar filter element inside.

DETAILED DESCRIPTION OF THE PREFERRED EMBODIMENT(S)

The inverse flow depth filter assembly of this invention is intended primarily for use in pneumatic systems to filter pressurized air. However, other gases may be similarly filtered and benefit from the inverse art flow pattern created by this invention. Therefore, when the term "air" is used, it is meant to encompass all gases.

Figure 1:
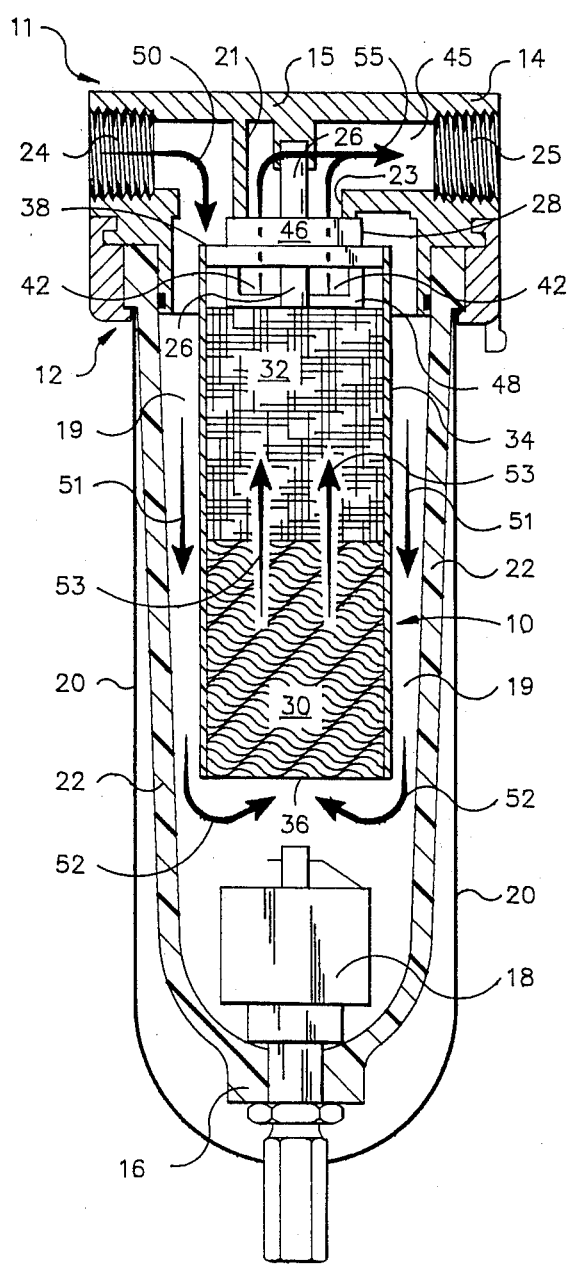
FIG. 1 is a cross section through the single housing embodiment of the inverse flow depth filter assembly of this invention with arrows indicating air flow.

Referring now to the drawings, particularly to FIG. 1, single housing embodiment 11 of the inverse flow depth filter assembly is shown in cross section. Single housing embodiment 11 has housing 12 and filter cartridge 10. Housing 12 includes gas inlet means 24 and gas egress means 25, both preferably hosing or piping with conventional attachment to housing top 14 (a conventional head assembly). Housing top 14 also includes a collar formed by walls 21 and 23 and which surrounds pin 26. Pin 26 is threaded at both ends, a first threaded end securing pin 26 to top cap 15 of housing top 14, the second end threaded into threaded central aperture 40 (not shown) of cartridge 10, thereby providing means to suspend cartridge 10 inside housing 12. Housing bottom 16 includes drain 18, shown here as a Wilkerson drain, but which may be any automatic drain, as is known in the art. Surrounding housing side wall 22 and housing bottom 16 is guard 20, preferably domed in shape and constructed of a rigid and strong material, preferably metal. It is preferred that housing top 14 be generally constructed of high impact resistant plastic and that side walls 22 be polycarbonate.

Cartridge 10 has side wall 34, open bottom 36, top 38 and plug 28 to generally close cartridge top 38. Plug 28 is seen to have air ports 42 in base 48 and collar 46. Cartridge 10 is preferably constructed of polycarbonate or other durable plastic, but other materials which are not easily damaged by high velocity air are possible. Seen inside cartridge 10 are two filter elements of dissimilar materials, filter elements 30 and 32. Construction of filter cartridge 10 is better explained in reference to FIGS. 2 and 3.

FIG. 1 also illustrates the flow of air within single housing embodiment 11. Air enters housing 12 through air inlet means 24 in the direction of arrow 50. Air is then forced downward into annular channel 19 in the direction of arrow 51. When air reaches cartridge bottom 36, it is allowed to enter cartridge 10 in the direction of arrows 52. Air then flows upward in the direction of arrows 53, passing through filter elements 30 and 32. Air passes out of cartridge 10 though ports 42 in plug 28 in the direction of arrows 55 to exit through gas egress means channels 45 and 25.

Filter element 30 is preferably tightly packed stainless steel twist and filter element 32 is preferably cotton/stainless steel mesh, both conventional filter media. As air passes through cartridge 10, water vapor travels more slowly because of its greater weight. It collects on the filter element, and eventually coalesces and drops to housing bottom 16 to be drained out through drain 18. Drain 18 is shown here as an automatic float drain, but a manual drain is also possible.

It has been discovered that it is critical for greatest filter efficiency for air to travel vertically upward though fiber mesh and twist filters. By running the entrained vapor vertically upward, the vapor coalesces on the wire and is briefly held there. As more and more entrainment water is collected on the wire, the mass of the droplet becomes great enough to allow it to fall freely back against the upward vapor flow and drain out drain 18. It is important not to run entrained vapor vertically downward in a filter system unless there are other vapor traps or filters further downstream. When flowing in a downward direction, vapor reentrains coalesced liquid from the bottom of the filter and thus considerably reduces the overall efficiency of the filter.

In order to overcome that problem and assure that the air is channeled in an upward vertical direction so that droplets all in an opposite direction to the air flow, and are therefore not being reentrained, cartridge 10 is provided. Cartridge 10 prohibits air and vapor from entering filter elements 30 and 32 when the air is travelling downward. Air enters filter elements 30 and 32 only through cartridge bottom 36 and it then flows upward for greatest filter efficiency.

In addition to air flow, it is well known in the art that a depth filter removes more vapor than a standard flat filter, but that use of a depth filter sometimes reduces air pressure and flow. In a test on the above-described inverse flow depth filter assembly, standard filters and the depth filter were subjected to a continuous 20 SCFM (standard cubic feet per minute) of air at 100 PSIG (pounds per square inch gravity). Vapor was released into the air stream at 40 drops per minute. Using a standard bronze filter, visible vapor was present downstream of the filter in 90 seconds. With a standard fiber element, water vapor and droplets were present within 8 minutes. With the above-described depth filter assembly, there were no visible vapor or water droplets after 30 minutes. Thus, more vapor is removed with the use of the present filter assembly.

In order to test the effect of the inverse flow depth filter on air pressure and flow, another test was run. In this test, air, with vapor introduced at a rate of 40 droplets per minute, was fed through several depth filter assemblies to determine if the filter would reduce air pressure. Continuous free flowing air was fed into the assemblies at 100 (PSIG). With the present invention, at 20 SCFM, there was a 5 PSIG drop. With the standard depth filter there was a 10 PSIG drop at 20 SCFM. At 40 SCFM the present model showed a 12 PSIG drop and the standard showed a 18 PSIG drop. At each level, the present invention showed less reduction in pressure that the standard depth filter.

Thus, through testing, it has been shown that the inverse flow depth filter assembly of this invention not only extracts the vapor from air travelling through it, but it also allows air to flow in a pattern that does not reduce the air pressure significantly. This improved performance is especially important in the fluid power industry where these filters are used. Pneumatic systems require connditioned air and the filter of this invention performs better than prior filters in moisture removal from compressed air lines without significant pressure loss.

Figure 2:
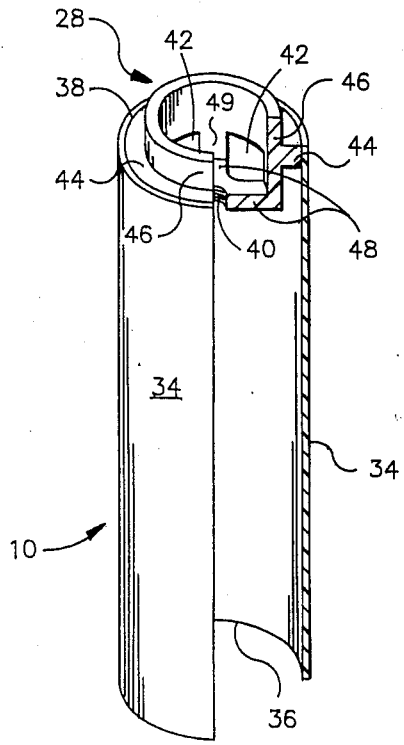
FIG. 2 is an isometric with a partial cutaway illustrating the filter cartridge of this invention.
Figure 3:
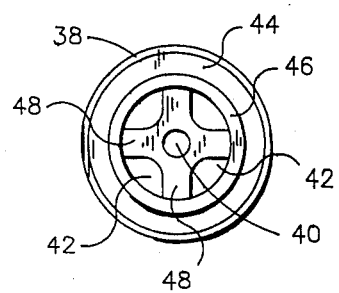
FIG. 3 is a top view of the cartridge of FIG. 2.

Now referring particularly to FIGS. 2 and 3, an isometric view and a top view, respectively, illustrate cartridge 10. Cartridge 10 has cylindrical wall 34, open bottom 36, and top 38 with plug 28. Plug 28 is tri-level with raised collar 46, lip 44, and base 48. Lip 44 is preferably sealed to the inner edge of cartridge wall 34 at top 38. Raised collar 46 is sized to form a seal with the collar formed by sections 21 and 23 (seen in FIG. 1) when pin 26 is threaded into pin receiving means 40.

Base 48, collar 46 and lip 44 are preferably one unit of molded polycarbonate. Base 48 includes pin receiving means 40 and extends to uprights 49 to form air egress ports 42 therebetween. As air passes upward through filter cartridge 10, it exits through ports 42 and enters channel 45 to exit housing 12 through gas egress means 25 (all seen in FIG. 1). Plug 28 is preferred to other plug configurations because it allows even air flow through filter cartridge 10.

Now referring to FIGS. 4, 5 and 6, the tandem embodiment 60 of the inverse flow depth filter assembly of this invention is illustrated. Embodiment 60 has first housing 61 surrounded by guard 76 and second housing 75 surounded by guard 77. First housing 61 has housing top 62 and housing bottom 63 with drain 64. Housing top 62 includes gas inlet means 65, gas egress means 66 and pin 78. Suspended inside housing 61 by pin 78 is cartridge 10 with plug 28 in cartridge top 38, wall 34, and open bottom 36. First channel 70 is seen between housing wall 80 and cartridge wall 34.

Second housing 75 has top 83, bottom 82 in which is placed drain 74, and wall 82. Housing top 81 includes gas inlet means 68 and gas egress means 69. Gas inlet means 68 is operably connected to gas engress means 66 of housing 61 by gas line means 67. Suspended by pin 79 from housing top 81 is cartridge 10 containing filter element 32. Second channel 72 is found between housing wall 82 and cartridge wall 34.

In FIGS. 5 and 6, each cartridge 10 is seen containing a different filter element, filter element 30 in FIG. 5 and filter element 32 in FIG. 6. Cartridge 10 has top 38 with plug 28, wall 34, and open bottom 36.

The air flow pattern in tandem housing embodiment 60 is illustrated in FIG. 4 and is similar to that in single housing embodiment 11. Air enters gas inlet means 65 and flows downward in the direction of arrow 90 to flow down first channel 70 in the direction of arrows 91. When it reaches open bottom 36 of cartridge 10, air flows upward in the direction of arrows 92. Air then flows upward through cartridge element 30 in the direction of arrows 93 where moisture is efficiently extracted because of the upward air flow pattern. Air then flows out plug 28 in the direction of arrows 94 and into gas egress means 66. From gas egress means 66 air flows into gas line connect means 67 and into gas inlet means 68 of second housing 75 in the direction of arrow 95. After leaving gas inlet means 68, air flows in the direction of arrow 96 through second channel 72 until it reaches cartridge bottom 36. At bottom 36, air flows into cartridge 10 in the direction of arrows 97 to flow upward in the direction of arrows 98 through filter element 32. Air exits cartridge 10 through plug 28 in the direction of arrow 99 and exits second housing 75 through gas egress means 69.

There are several variations which can be practiced in the scope of this invention. First, the inverse flow depth filter assembly of this invention may be supplied with either a single housing with suspended cartridge or two housings in tandem, each with a suspended cartridge. In both cases, the inverse flow of air is achieved for greatest efficiency of the filter elements.

Second, the cartridge of this invention can be used with either one or two dissimilar filter elements.

Also, although stainless steel twist and cotton/stainless steel mesh are the preferred filter element for air filtration, use of other filter elements would also achieve greater efficiency since the air pattern has air flowing upward and vertical, not downwards through the filter picking up moisture.

Guards 76, 77 and 20 are optional, although they are prefererd when the housing walls are plastic or glass.

Although in the double housing embodiment 60, housings 61 and 75 are illustrated in dissimilar sizes, it is within the scope of this invention to have housings of the same size.

Also, although two different drain types, automatic float drains (drains 18 and 64) and manual drains (drain 74) are illustrated, any conventional drain of either automatic or manual type may be used to drain out the collected condensates and dirt.

There are many advantages to the inverse flow depth filter assembly of this invention. Chiefly, by placing the filter elements in a cartridge and positioning the cartridge in the center of the housing, a channel is created and air flow is directed through the cartridge and filter elements in a vertically upward direction, gaining full efficiency from the filter elements.

Having now illustrated and described my invention, it is not intended that such description limit this invention, but rather that this invention be limited only by reasonable interpretation of the appended claims.

What is claimed is:

1. An inverse flow depth assembly with at least one gas permeable filter element, said depth filter assembly comprising:

an elongated housing with a top, a bottom and walls defining an open internal cross-section, the housing having gas inlet means and gas egress means at said top, and drain means at said bottom, the top having an underside; and, a filter cartridge, said filter cartridge being a generally hollow tube of gas impermeable material of a lesser circumference than said internal cross-section of said housing and including an open, gas permeable cartridge bottom and a cartridge top with a passage leading to the gas egress means, the filter cartridge having means on said cartridge top suspending said cartridge from said underside of the top so that an annular channel is defined between said walls of the housing and said tube of said cartridge, a filter material being disposed in the tube of the filter cartridge, the filter material being a non-absorptive fibrous material operable to coalesce droplets from passing gas, whereby gas moves through said housing along a path through said inlet means, downward through said annular channel, and upward through said filter cartridge to exit through said gas egress means, vapor droplets and condensates falling in a direction opposite flow of the gas, to said housing bottom, to be drained from said assembly through said drain.

2. The inverse flow depth filter assembly according to claim 1, wherein two filter materials are included in said filter cartridge, said filter materials being dissimilar and stacked one atop the other, at least an upstream one of said filter materials having a gas permeable coalescent filter element of said non-absorptive fibrous material, and being located below the other of said two filter materials.

3. The inverse flow depth filter assembly according to claim 1, further comprising a shatter resistant gaurd circumscribing said housing.

4. The inverse flow depth filter assembly according to claim 1, further comprising cartridge receiving means in said top of the housing, and wherein said cartridge top includes a plug, said plug including an annular lip sealed to said tube, a sectional base including a central threaded aperture and continuous upright sections sealed to a collar and forming gas egress ports, and an annular raised collar sealed to said lip and said upright sections and sized to form a circumferential seal with said housing.

5. An inverse flow depth filter assembly, comprising:

an elongated, generally elliptical housing with a top and a bottom defining a substantially closed volume, the housing including gas inlet means and gas egress means at said top, and drain means at said bottom;

a filter cartridge, said filter cartridge being a generally hollow tube of gas impermeable material of lesser circumference than an internal cross-section of the housing and including an open cartridge bottom and a cartridge top connected to the gas egress means, the cartridge having means on said cartridge top to suspend said cartridge from said underside of the top, an impermeable annular channel being defined between said housing and said tube; and, at least one filter element in said cartridge, said filter element being gas permeable and including a coalescent non-absorptive fibrous material operable to collect droplets from gas passing through the filter element, the filter element filling generally an entire interior of said tube, the tube defining an upward flowpath for the gas and a downward flowpath for the droplets, whereby when gas under pressure enters said housing through said inlet means, the gas flows downward along said annular channel, upward through said open cartridge bottom and through said filter element to exit through said gas egress means, vapor droplets and condensates falling to said housing bottom to be drained from said assembly through said drain.

6. An inverse flow depth filter assembly, comprising:

(a) a first housing with a top and a bottom, the first housing being elongated between the top and the bottom and including gas inlet means and gas egress means at the top and drain means at said bottom;

(b) a first filter cartridge with a generally hollow tube of lesser circumference than an internal cross-section of said first housing, the hollow tube having substantially gas impermeable side walls, a gas-permeable cartridge bottom and a cartridge top leading to the gas egress means of the first housing, with means on said cartridge top and on the top of the first housing suspending the first filter cartridge on the underside of said top of the first housing, so that a first annular channel is defined between said first housing and said first filter cartridge;

(c) a first filter element in said first filter cartridge, said first filter element being gas permeable and filling generally an entire interior of said first filter cartridge, the first filter element including a liquid coalescing non-absorptive fibrous material operable to collect liquids from gases passing through said first filter element;

(d) an elongated, generally elliptical second housing with a top and a bottom, the top having an underside, the second housing including at the top of said second housing inlet means and gas egress means and at the bottom of said second housing a bottom drain means;

(e) a second filter cartridge with a generally hollow tube of lesser circumference than an internal cross-section of said second housing ,the follow tube having substantially gas impermeable side walls, a gas-permeable cartridge bottom and a cartridge top leading to the gas egress means of the second housing, with means on said second filter cartridge top and on the top of the second housing suspending the second filter cartridge from the underside of said top of said second housing, so that a second annular channel is defined between said second housing and said second filter cartridge;

(f) a second filter element in said second filter cartridge, said second filter element being gas permeable and filling generally an entire interior of said second filter cartridge; and, (g) a gas line connecting said gas egress means of said first housing with said gas inlet means of said second housing, whereby, when gas under pressure enters said first housing thorugh the gas inlet means of the first housing, the gas flows downward along said first annular channel, upward through said open bottom of said first filter cartridge and through said first filter element to exit through said gas egress means of the first filter cartridge and into said gas line connecting the gas egress means of the first housing with the gas inlet means of the second housing, and the gas then flowing through said gas inlet means of said second housing into said second housing where the gas flows downward along said second annular channel and upward through said open cartridge bottom of said second filter cartridge and through said second filter element to exit through said gas egress means of said second housing, vapor and condensates falling to the bottom of at least one of said first and second housings to be drained from said assembly through said drains.

7. The inverse flow depth filter assembly according to claim 6, further comprising shatter resistant guards surrounding said first and second housings.

8. The inverse flow depth filter according to claim cm 6, wherein said first and second filter elements are dissimilar.

9. In an inverse flow depth filter assembly having an elongated, generally elliptical housing with a top and a bottom, gas inlet means and gas egress means at the top, and drain means at the bottom, the improvement comprising:

a filter cartridge, said filter cartridge having a generally hollow gas impermeable tube with an open bottom, the tube being of lesser circumference than an internal cross-section of the housing and the tube having an open cartridge bottom and a cartridge top leading to the gas egress means of the housing, the tube and the housing having means to suspend said cartridge from an underside of the top of the housing, so that an annular channel is created between said housing and said cartridge, the filter cartridge having a coalescent non-absorptive fibrous material therein, the housing and the filter cartridge together defining a downward annular passage for gas from the top of the housing to the bottom of the housing, and an upward passage for the gas through the filter cartridge through the bottom of the housing to the gas egress means, condensates collected by the filter material moving downwardly through the filter material to the bottom of the housing, opposite gas flowing upwardly through the filter material.

10. The inverse flow depth filter assembly according to claim 9, further comprising cartridge receiving means in the top of the housing and wherein said cartridge top includes a plug, said plug including an annular lip sealed to said cartridge wall, a sectional base including continuous upright sections sealed to a collar and forming gas egress ports, and an annular raised collar sealed to said lip, said upright sections being sized to be sealably received by said cartridge receiving means.

* * * * *

UNITED STATES PATENT AND TRADEMARK OFFICE
CERTIFICATE OF CORRECTION

PATENT NO. : 4,822,387

DATED : April 18, 1989

INVENTOR(S) : Keith L. Daniels

It is certified that error appears in the above-identified patent and that said Letters Patent is hereby corrected as shown below:

Column 1, line 43, following the word "filtration", delete the word "whihout" and insert therefor -- without --.

Column 2, line 68, following the word "inverse", delete the word "art" and insert therefor -- air --.

Column 6, line 56, Claim 3, delete the word "gaurd" and insert therefor -- guard --.

Column 7, line 57, Claim 6, delete the words "housing inlet" and insert therefor -- housing gas inlet --.

Column 7, line 62, Claim 6, delete the word "follow" and insert therefor -- hollow --.

Signed and Sealed this

Twenty-third Day of January, 1990

*Attest:*

JEFFREY M. SAMUELS

*Attesting Officer*  *Acting Commissioner of Patents and Trademarks*